July 30, 1963 T. D. SOLES, JR 3,099,250
ANIMAL LEASHES
Filed Feb. 15, 1962 3 Sheets-Sheet 1

INVENTOR.
THOMAS D. SOLES, JR.
BY J. Hanson Boyden
ATTORNEY

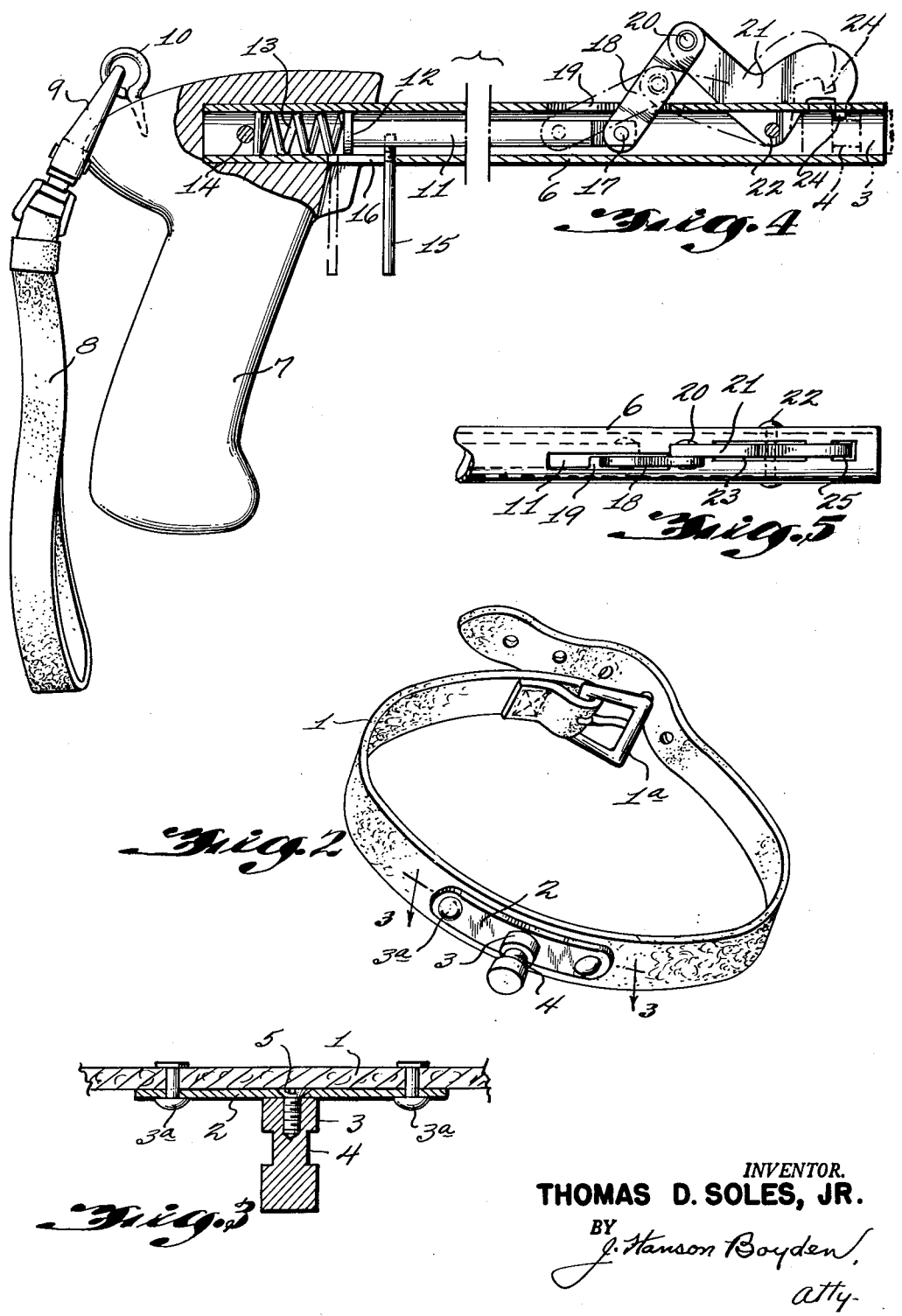

July 30, 1963 T. D. SOLES, JR 3,099,250
ANIMAL LEASHES
Filed Feb. 15, 1962 3 Sheets-Sheet 3
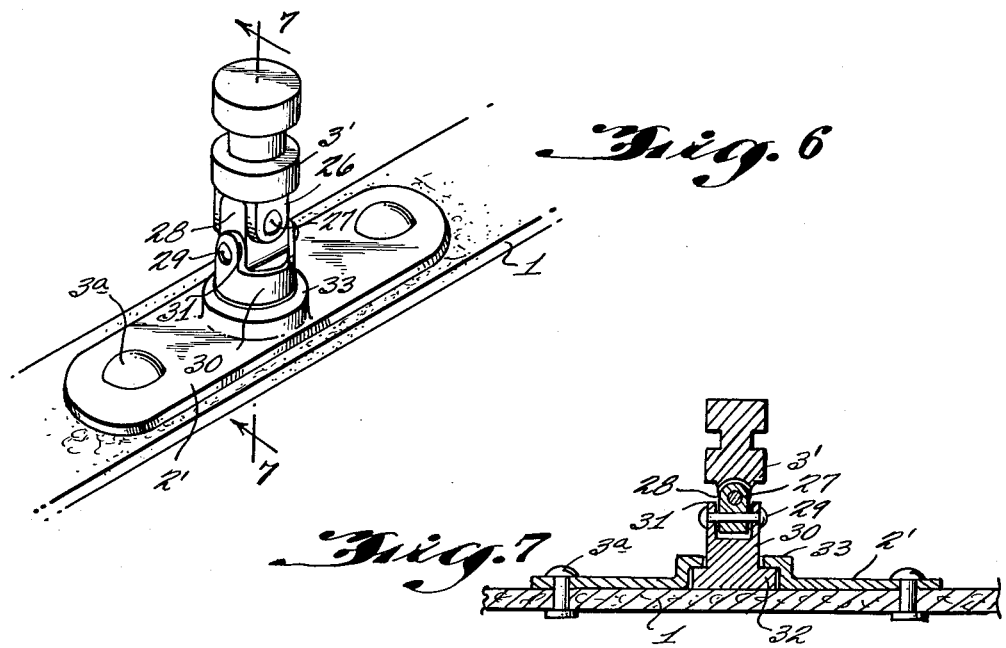
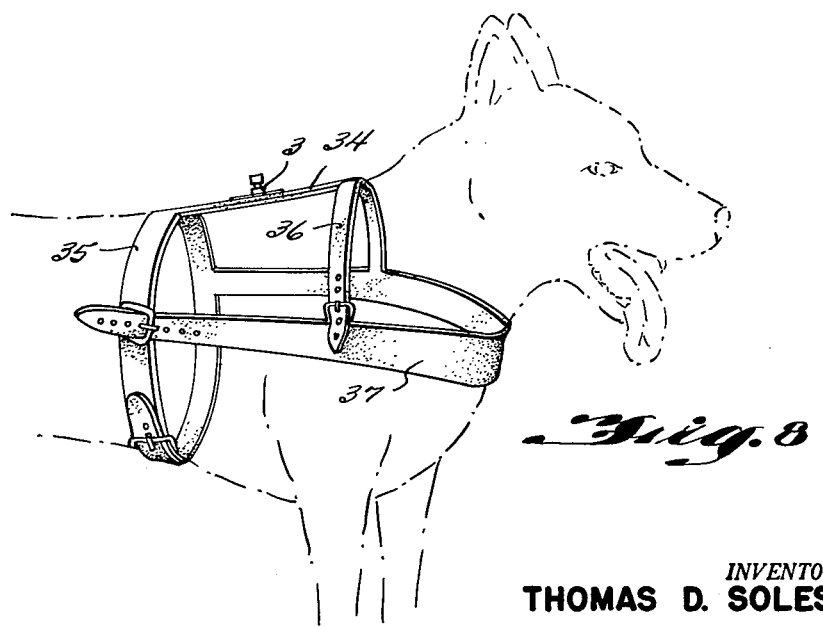
INVENTOR.
THOMAS D. SOLES, JR.
BY J. Hanson Boyden
ATTORNEY 3,099,250
ANIMAL LEASHES
Thomas Doswell Soles, Jr., 916½ W. Franklin St.,
Richmond, Va.
Filed Feb. 15, 1962, Ser. No. 173,551
4 Claims. (Cl. 119—114)

This invention relates to devices for restraining, controlling and handling animals, and more particularly to an improved dog leash.

While my improved leash may be employed for handling dogs in field trials or at shows, it has been designed especially for use in controlling police dogs.

Many attempts have been made to provide dog restraining or controlling means so designed that the animal may be instantly released when desired, but all such prior proposed devices have included a flexible chain, strap or tube extending from the handler's hand to a collar or the like attached to the dog. If the dog actively turns and twists about, as many of them do, the flexible control member is likely to become twisted, and this twist might result in rendering the release mechanism inoperative or causing it to be unintentionally operated.

One object of the invention is to overcome this objection by providing a rigid control member having at one end means by which it may be firmly grasped by the handler, and at the other end means for attaching it to the dog collar or the like by means of a swivel connection capable of rotating through a full 360°. This makes it impossible for the leash to become fouled or twisted, and moreover enables the handler to control the animal more effectively.

In the case of police dogs, the invention has another and special advantage. Police dogs sometimes become so excited that they turn and attack their handler. The conventional flexible leash affords no protection against this, but with my novel rigid leash member the handler can keep the dog at a distance.

Another object of the invention to devise a leash having an improved quick-release mechanism which is reliable and efficient when locked and which is released by the application of a positive force, so that it cannot fail to operate when desired.

A still further object is to provide a quick-release leash of this character which may be used as a personal defense weapon when detached from the animal.

Yet another object of the invention is to design a dog leash of this nature which is of exceptionally simple and rugged construction, and which is capable of withstanding a great deal of rough usage.

With the above and other objects in view, and to improve generally on the details of such devices, the invention consists in the construction and combination of parts hereinafter described and claimed, and illustrated in the accompanying drawings forming part of this specification, and in which:

FIG. 2 is a perspective view of the collar itself showing my improved means for connecting the collar to the leash;

FIG. 3 is a transverse section on a somewhat enlarged scale on the line 3—3 of FIG. 2;

FIG. 4 is a view partly in longitudinal section and partly in side elevation showing the complete improved leash;

FIG. 5 is a fragmentary plan view of the end portion of the leash shown in FIG. 4;

FIG. 6 is a perspective view of a modified means of attaching the connecting stud to the dog leash;

FIG. 7 is a section on the line 7—7 of FIG. 6 looking in the direction of the arrows;

FIG. 8 is a fragmentary perspective showing the connecting stud mounted upon a harness instead of on a collar, the outline of the dog being shown in broken lines.

Figures 1, 9:
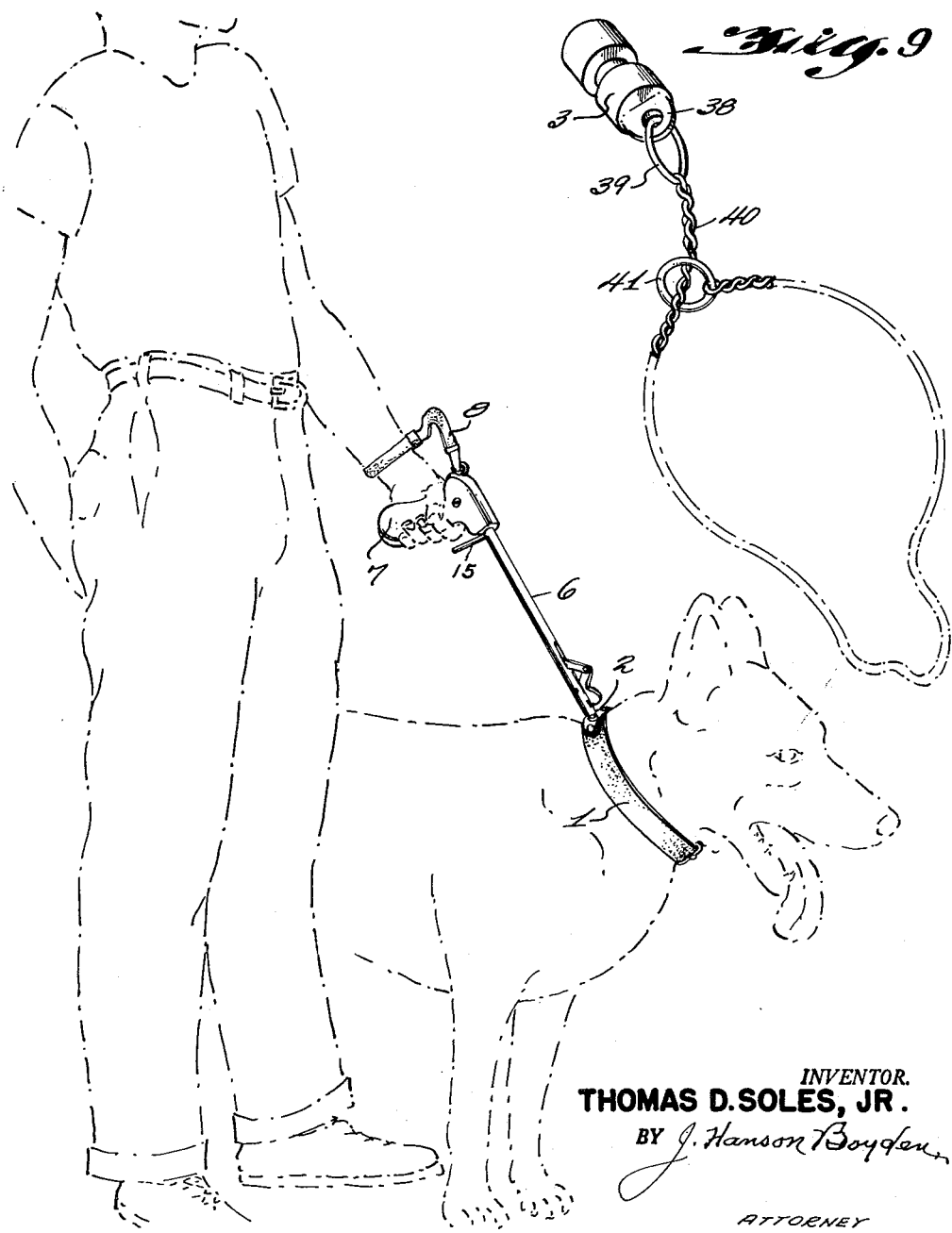
FIG. 1 is a perspective view showing my improved leash as it appears when applied to a dog collar, the dog and handler being shown in broken lines.
FIG. 9 is a perspective view illustrating my improved connecting stud as used in connection with a choke chain, the chain outline being shown partly in broken lines.

Referring to the drawings in detail, my improved leash is shown in FIGS. 1 and 2 as being equipped with means for connecting it to the usual dog collar 1, having a buckle 1ª. The improved connecting means comprises a stud 3 rigidly secured to and projecting from a metal plate 2 by means such as a screw 5 (FIG. 3), the plate 2 being attached to the collar 1 as by means of rivets 3ª.

The leash itself as shown in FIGS. 1, 4 and 5 comprises a rigid control member shown in the form of a tube 6, preferably made of metal. One end of this tube is set into a socket formed in a pistol grip 7. The leash also comprises a looped strap 8 adapted to surround the wrist of the handler as shown in FIG. 1, this loop being attached to the pistol grip 7 by means of a snap hook 9 and screw eye 10.

A rod 11 is disposed inside of the tube 6 and preferably has an enlarged head 12 which bears against one end of a spring 13 enclosed within the tube, the other end of the spring bearing against a cross pin 14. Secured to the rod 11 and extending at right angles thereto is a trigger 15, which works freely through a slot 16 in the tube 6.

The other end of the rod 11 is connected by means of a pivot 17 with one end of a short link 18 which extends up through a slot 19 in the tube 6. The other end of this link is connected by means of a pivot 20 to one end of a hook-shaped element 21, pivoted at 22 on a pin extending transversely through the tube.

The stud 3 is formed with an annular groove or portion of reduced diameter 4 as clearly shown in FIGS. 2 and 3, and the hook element 21 has at its free end a projection 24 adapted to pass through an opening 25 in the tube (see FIG. 5) and engage in the groove 4 of the stud 3 as shown in FIG. 4. This stud fits snugly in the open end of the tube, and when the parts are in the position shown in full lines in FIG. 4, the stud is securely locked within the tube by the projection 24 on the hook or latch member 21. It will, however, be noted that, due to the annular groove 4, the stud and dog collar are free to rotate through 360° within the tube. Thus there can be no tendency to twist or deform the tube no matter how much the dog may turn and twist.

By reference to FIG. 1, it will be seen that the handler controls the dog through the rigid tube 6, which may be of any desired length but would usually be from 12″ to 18″ long. This rigid tube enables the handler to keep the dog at a safe distance, even if the dog, in its excitement, should attempt to attack him.

When the handler desires to release the dog, all he has to do is to pull the trigger 15 with his finger. This results in rocking the latch or hook member 21 on its pivot into dotted line position as shown in FIG. 4, thus withdrawing the point 24 of the hook from the groove 4 of the stud and permitting the tube to be instantly disengaged from the stud. The hook is normally held in engagement with the groove in the stud by means of the spring 13, and is withdrawn by a positive force exerted by the handler on the trigger 15. Furthermore, as will be readily understood, when the control member or tube is disengaged from the stud 3 as above explained, the entire leash including the tube 6 and relatively large and heavy handle 7 becomes available to the handler as a defense weapon.

To still further facilitate free movement of the dog relative to the control member or tube 6, I may provide a universal joint between the stud and the dog collar. This is illustrated, by way of example, in FIGS. 6 and 7. The stud 3' is formed with a pair of spaced ears 26 adapted to straddle a block 28 and pivoted to this block by means of a pin 27. The block itself is pivoted by a pin 29 at right angles to the pin 27, to a pair of ears 31 formed on a swivel member 30, having at its end a flange 32 rotatably mounted within a socket 33 of a plate 2' secured to the collar 1.

With such a construction it will be seen that not only can the control tube rotate freely or swivel with respect to the dog collar, as shown in FIGS. 1 and 4, but it may also bend in any direction with respect to the collar, thus permitting the maximum freedom of movement. Any other well-known form of universal joint may of course be employed.

In FIG. 8 I have illustrated how my improved connecting stud can be mounted on a dog harness instead of a collar. In this figure the stud 3 is shown as secured to a strap 34, the ends of which are in turn fastened to a body-encircling strap or band 35 and a second strap 36 which supports a breast strap 37 secured to the band 35. The operation of this modification is of course substantially the same as above described.

In FIG. 9 I have illustrated still another method of using my improved connecting stud 3. In this figure I have shown the stud as provided at its end with an eye 38 through which passes a ring 39 to which is attached a choke chain 40. This chain passes through ring 41 secured to the other end of the chain and is adapted to extend around the dog's neck. This type of animal encircling device may be employed in certain cases in place of the collar or harness.

It will thus be seen that I have devised an improved animal leash including a rigid member 6 having at one end a grip by which it may be firmly grasped by the handler and having at the other end quick-detachable means adapted to rotatably engage a stud fixed to an animal encircling device and it is thought that the many advantages of the invention will be readily appreciated by those familiar with such matters.

What I claim is:

1. An animal leash comprising an elongated control member in the form of a tube, grip means at one end by which it may be firmly grasped by the handler, means at the other end for connecting it to an animal encircling device, said control member being permanently rigid throughout its length, from said grip means to said animal encircling device, and manually controlled latch means mounted on and operated through said tube from said grip means for releasing said connecting means.

2. An animal leash in accordance with claim 1 in which the connecting means comprises a stud secured to said animal encircling device, and in which said rigid control member has an open end providing a socket adapted to fit axially over and rotatably engage said stud.

3. An animal leash in accordance with claim 1 in which the connecting means comprises a stud secured to said animal encircling device, and in which said rigid control member is in the form of a tube extending axially of and having a swiveled connection with said stud.

4. An animal leash comprising a rigid tube, grip means at one end by which it may be firmly grasped by the handler, a latch at the other end of said tube, manually operated release means extending lengthwise of said tube by which said latch may be operated by the handler, an animal encircling device having a stud fixed thereto, said tube adapted to fit axially over said stud at a point adjacent said latch, and said stud having a groove in which said latch engages, whereby said animal encircling device and stud may rotate freely relative to said tube.

References Cited in the file of this patent

UNITED STATES PATENTS

| | | |
|---|---|---|
| 602,569 | Turner | Apr. 19, 1898 |
| 2,337,970 | Cassell | Dec. 28, 1943 |
| 2,714,873 | Mosby | Aug. 9, 1955 |
| 2,784,698 | Dieppa | Mar. 12, 1957 |
| 2,821,169 | Barhost | Jan. 28, 1958 |
| 2,833,249 | Cornman | May 6, 1958 |

FOREIGN PATENTS

| | | |
|---|---|---|
| 838,254 | France | Nov. 28, 1938 |